(12) United States Patent  
Lim

(10) Patent No.: US 9,128,633 B2  
(45) Date of Patent: Sep. 8, 2015

(54) SEMICONDUCTOR MEMORY DEVICE AND METHOD OF OPERATING THE SEMICONDUCTOR MEMORY DEVICE

(71) Applicant: SAMSUNG ELECTRONICS CO., LTD., Suwon-si, Gyeonggi-do (KR)

(72) Inventor: Eui Cheol Lim, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 51 days.

(21) Appl. No.: 14/019,807

(22) Filed: Sep. 6, 2013

(65) Prior Publication Data

US 2014/0006648 A1    Jan. 2, 2014

Related U.S. Application Data

(63) Continuation of application No. 12/613,756, filed on Nov. 6, 2009, now Pat. No. 8,549,181.

(30) Foreign Application Priority Data

Nov. 6, 2008    (KR) .................. 10-2008-0109895

(51) Int. Cl.
```
G06F 3/00      (2006.01)
G06F 3/06      (2006.01)
G06F 13/42     (2006.01)
```
(52) U.S. Cl.
CPC ............ *G06F 3/0659* (2013.01); *G06F 3/0613* (2013.01); *G06F 3/0683* (2013.01); *G06F 13/4239* (2013.01)

(58) Field of Classification Search  
None  
See application file for complete search history.

(56) References Cited

U.S. PATENT DOCUMENTS

| 5,507,005 | A  | * | 4/1996  | Kojima et al. .................. 710/52 |
| 6,952,753 | B2 |   | 10/2005 | Ralphs |
| 7,050,940 | B2 |   | 5/2006  | Basso et al. |
| 2002/0176431 | A1 | * | 11/2002 | Golla et al. .................. 370/412 |
| 2007/0198771 | A1 | * | 8/2007  | Seo ............................. 711/106 |
| 2007/0233943 | A1 | * | 10/2007 | Teh et al. ...................... 711/105 |
| 2007/0266387 | A1 | * | 11/2007 | Henmi ......................... 718/102 |
| 2008/0065648 | A1 |   | 3/2008  | Gupta et al. |

FOREIGN PATENT DOCUMENTS

KR              100700156           3/2007

\* cited by examiner

*Primary Examiner* — Henry Tsai  
*Assistant Examiner* — Aurangzeb Hassan  
(74) *Attorney, Agent, or Firm* — F. Chau & Associates, LLC

(57) ABSTRACT

A method of operating a semiconductor memory device includes receiving a timeout index signal corresponding to a master of the first master group based on a residual capacity of a data buffer of the first master, setting a first timeout value in response to the timeout index signal, and changing an execution order of commands stored in a queue of the semiconductor memory device based on a result of counting the first timeout value and counting a second timeout value corresponding to a master of the second master group.

35 Claims, 9 Drawing Sheets

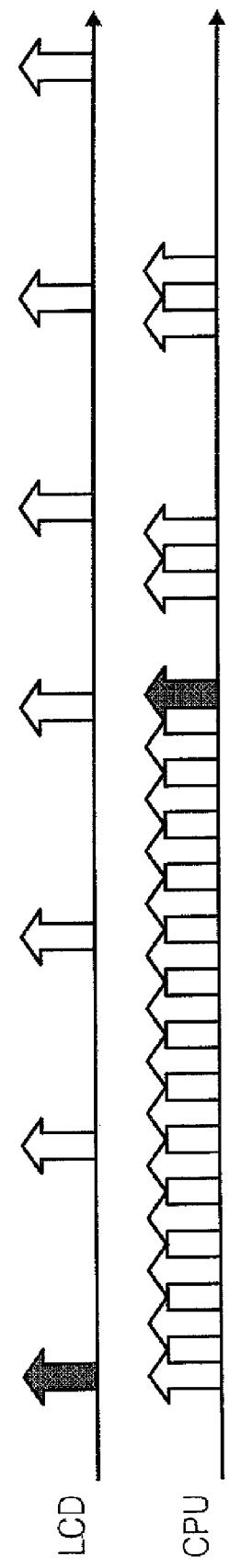

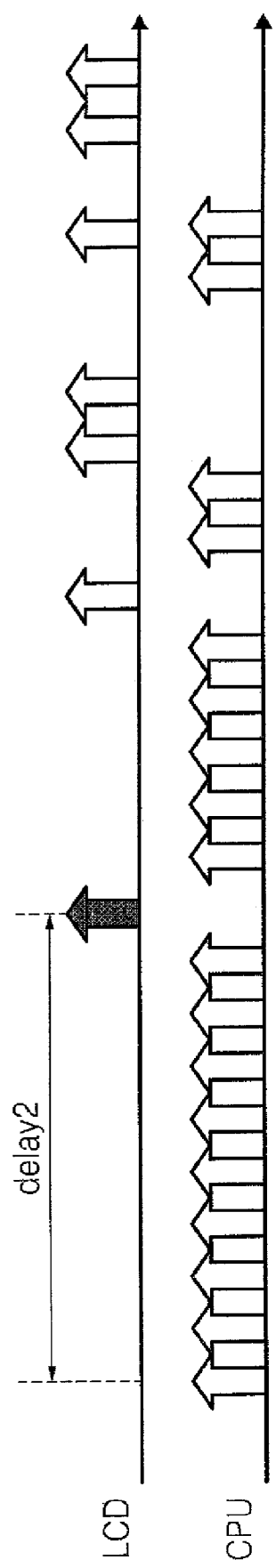

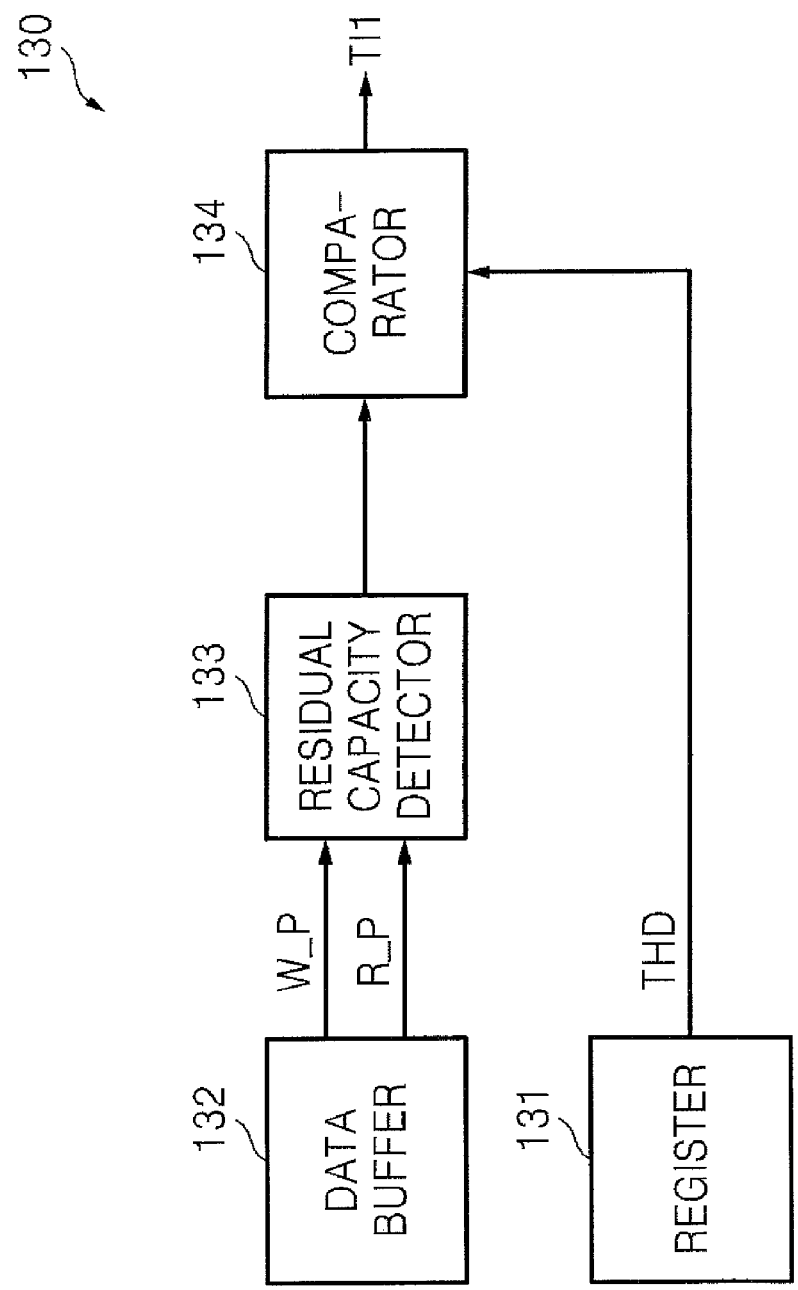

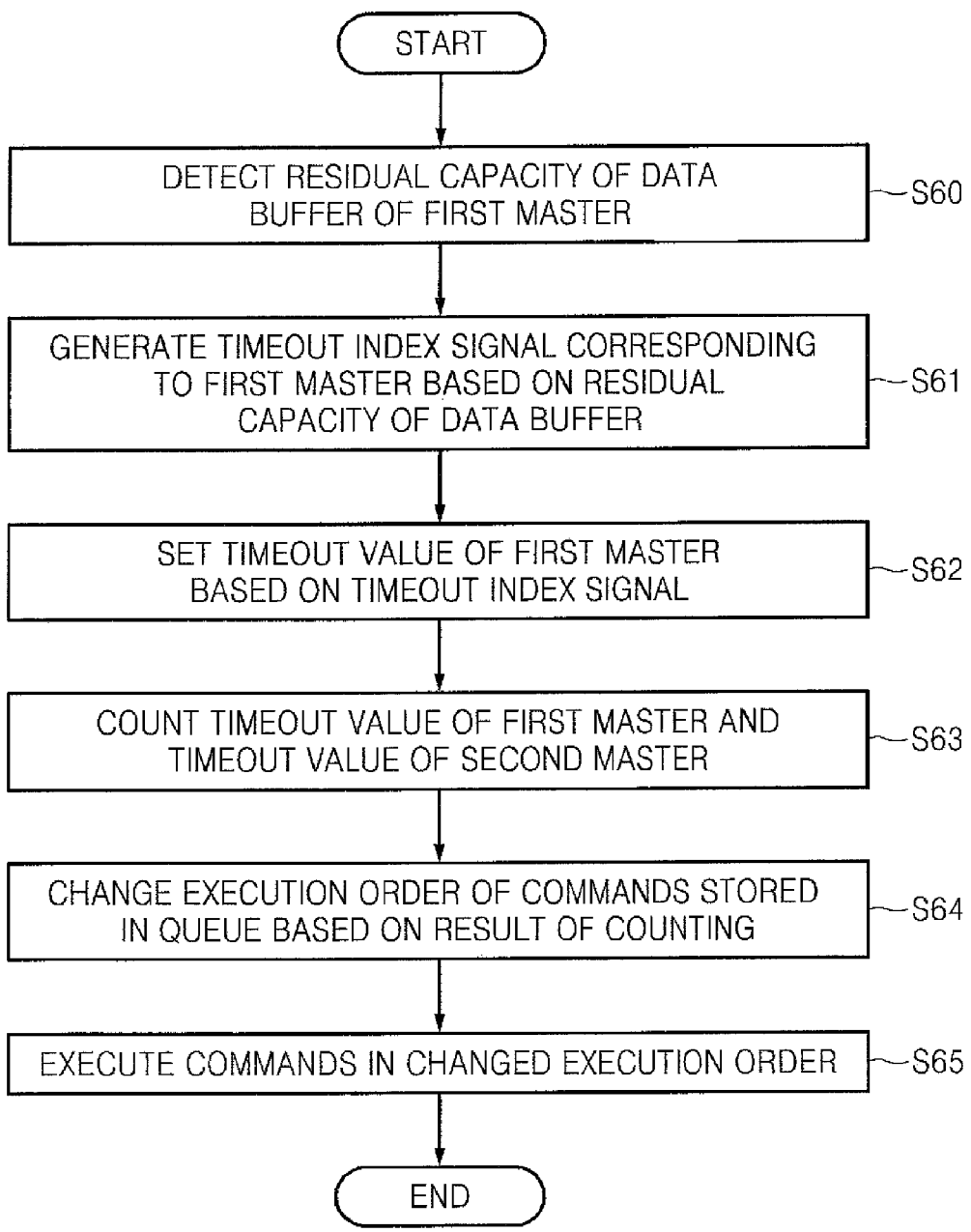

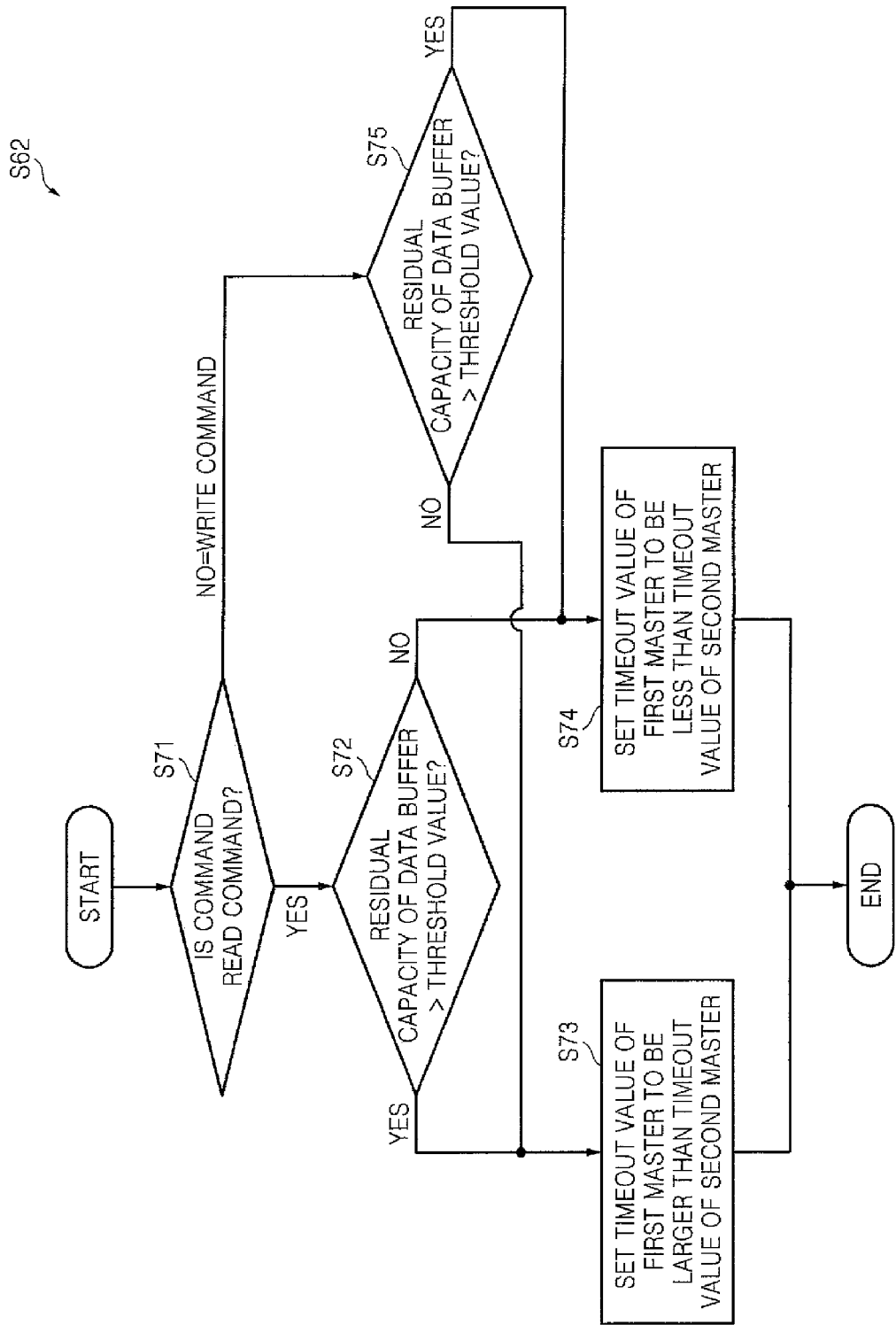

SEMICONDUCTOR MEMORY DEVICE AND METHOD OF OPERATING THE SEMICONDUCTOR MEMORY DEVICE

CROSS-REFERENCE TO RELATED APPLICATION

This application is a continuation of application Ser. No. 12/613,756, filed on Nov. 6, 2009, which claims priority under 35 U.S.C. §119(e) to Korean Patent Application No. 10-2008-0109895, filed on Nov. 6, 2008, in the Korean Intellectual Property Office, the disclosures of which are incorporated by reference in their entirety herein.

BACKGROUND

1. Technical Field

Exemplary embodiments of the present inventive concept relate to a semiconductor memory device, and more particularly, to a method of operating a semiconductor memory device to control the order of executing commands of a plurality of masters in a semiconductor memory system based on the remaining memory capacity of each master.

2. Discussion of Related Art

In a semiconductor memory system including a plurality of masters and a semiconductor memory device, quality of service (QoS) refers to the assignment of different priorities to commands from the masters. The semiconductor device executes a command when requested by a corresponding master.

In conventional semiconductor memory systems, a controller of a semiconductor memory device may include a timeout counter that counts to a timeout value with respect to each of the commands. The priorities of the commands may be determined based on the order in which the counting with respect to the commands is completed. A timeout value for the masters may be set to a relatively small timeout value for higher priority operations (e.g., real-time operations) and to a larger timeout value for lower priority operations (e.g., operations for controlling the operation of the semiconductor memory device).

Each master may include a data buffer with a varying amount of residual memory capacity, which may be used up unless its respective commands are handled in a timely manner. When the commands are of a same type (e.g., all are for lower-priority operations), each command will have the same priority, and thus each would be handled by the semiconductor memory system at or around the same time. However, when the residual memory capacity of the data buffer of a first master is lower than a second master, performance of the system may be deteriorate unless the commands of the first master is serviced before those of the second master. Thus, there is a need for a semiconductor device that execute the commands based on the residual capacities of data buffers of masters and a method of operating said device.

SUMMARY

According to an exemplary embodiment of the present inventive concept, a method of operating a semiconductor memory device connected with a first master group including at least one master and a second master group including at least one master through a data bus includes receiving a timeout index signal corresponding to a master of the first master group and generated based on a residual capacity of a data buffer of the master, setting a first timeout value in response to the timeout index signal, and changing an execution order of commands stored in a queue of the semiconductor memory device based on a result of counting the first timeout value and counting a second timeout value corresponding to a master of the second master group.

According to an exemplary embodiment of present inventive concept, a semiconductor memory device is connected with a first master and a second master through a data bus and includes a memory controller. The memory controller includes a register block, a time out counter, and a queue. The register block receives a timeout index signal corresponding to a master of the first master group and generated based on a residual capacity of a data buffer of the master and is configured to set a first timeout value in response to the timeout index signal. The timeout counter counts the first timeout value and counts a second timeout value corresponding to a master of the second master group. The queue is configured to receive commands and store the commands. An execution order of commands stored in the queue is changed based on a result of counting the first timeout value and counting the second timeout value.

BRIEF DESCRIPTION OF THE DRAWINGS

Embodiments of the present inventive concept will become more apparent by describing in detail exemplary embodiments thereof with reference to the attached drawings in which:

FIG. 2A is an exemplary timing chart conceptually illustrating transactions generated by a liquid crystal display (LCD) and a central processing unit (CPU) illustrated in FIG. 1;

FIG. 2C is an exemplary timing chart illustrating a change in the transactions generated by the LCD and the CPU when a timeout value for the LCD is larger than that for the CPU;

FIG. 3 is a block diagram for explaining a method for detecting a residual capacity of the LCD illustrated in FIG. 1 according to an exemplary embodiment of the present inventive concept;

FIG. 6 is a flowchart of a method of operating a semiconductor memory system according to an exemplary embodiment of the present inventive concept; and FIG. 7 is a flowchart of an operation of setting a timeout value for a first master in the method illustrated in FIG. 6 according to an exemplary embodiment of the present inventive concept.

DETAILED DESCRIPTION OF THE EXEMPLARY EMBODIMENTS

Figure 1:
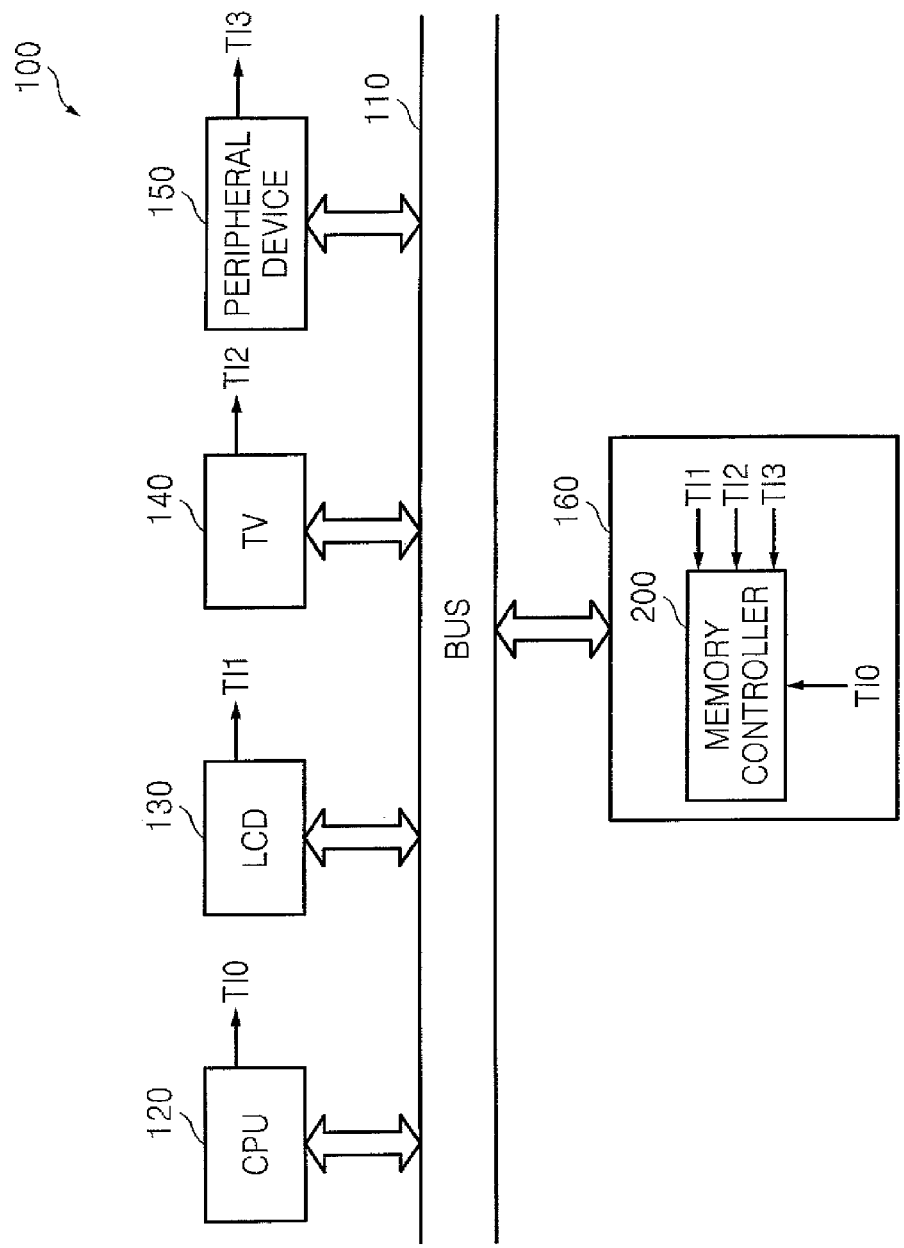
FIG. 1 is a block diagram of a semiconductor memory system including a semiconductor memory device according to an exemplary embodiment of the present inventive concept.

The present inventive concept now will be described more fully hereinafter with reference to the accompanying drawings, in which exemplary embodiments of the invention are shown. This invention may, however, be embodied in many different forms and should not be construed as limited to the exemplary embodiments set forth herein. In the drawings, like numbers refer to like elements throughout. It will be understood that when an element is referred to as being "connected" or "coupled" to another element, it can be directly connected or coupled to the other element or intervening elements may be present.

FIG. 1 is a block diagram of a semiconductor memory system 100 including a semiconductor memory device 160 according to an exemplary embodiment of the present inventive concept. The semiconductor memory system 100 includes a plurality of masters 120, 130, 140, and 150 and a semiconductor memory device 160 including a memory controller 200. Each of the masters 120 through 150 and the semiconductor memory device 160 are connected with one another through a data bus 110. Each of the masters 120 through 140 may be a controller of a corresponding master and may be embedded on a same chipset with the semiconductor memory device.

The masters 120 through 150 may be subdivided into different groups. For example, a first group of the masters (referred to as a first master group) may comprise those in which real-time operations are important and a second group of the masters (referred to as a second master group) may comprise those whose performances depend on the latency of the memory device 160. Each of the first masters may include a data buffer to buffer data associated with real-time operations to prevent the loss of data. As an example, the data buffer may be a line buffer having a first-in first-out (FIFO) structure.

In an exemplary embodiment of the present inventive concept, a liquid crystal display (LCD) 130 and a television (TV) 140, which display images in real time, and a peripheral device 150 requested to respond in real time corresponds to the first master group and a central processing unit (CPU) 120 whose performance depends on a speed supported by the semiconductor memory device 160 corresponds to the second master group.

Although not shown in FIG. 1, the second master group may include a multi format codec (MFC) subsystem to support a variety of image/data formats and a graphic engine. In FIG. 1, three masters 130 through 150 correspond to the first master group and one master 120 corresponds to the second master group. However, the present inventive concept is not restricted thereto. For example, one or more of the masters may be omitted or additional master may be added. A master may act independently of another master, while the actions of a slave device are dependent on a master.

Each of the masters 120 through 150 may generate a transaction requesting that the semiconductor memory device 160 (e.g., a dynamic random access memory (DRAM)) execute a particular command.

FIG. 2A is an exemplary timing chart conceptually illustrating transactions generated by the LCD 130 and the CPU 120 illustrated in FIG. 1. Referring to FIG. 2A, while the LCD 130 generates transactions at predetermined intervals based on a clock of an image signal, the CPU 120 irregularly generates transactions according to an operation state.

Figure 2B:
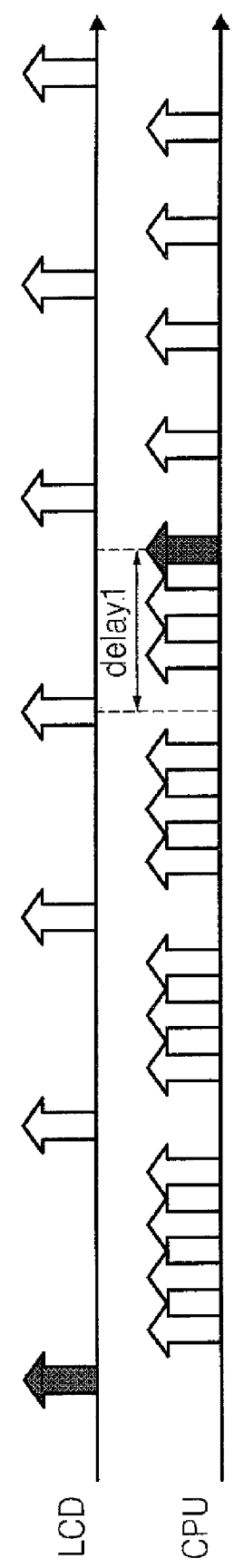
FIG. 2B is an exemplary timing chart illustrating a change in the transactions generated by the LCD and the CPU when a timeout value for the LCD is less than that for the CPU.

FIG. 2B is an exemplary timing chart illustrating a change in the transactions generated by the LCD 130 and the CPU 120 when a timeout value for the LCD 130 is less than that for the CPU 120. Referring to FIG. 2B, since the LCD 130 is serviced (e.g., a command of the LCD 230 is executed) prior to the CPU 120 during any one of its given intervals, the real-time operation of the LCD 130 may be ensured, but the performance of the CPU 120 may be deteriorated due to a service time delay "delay1". A higher frequency clock may be used to prevent the performance deterioration in the CPU 120.

FIG. 2C is an exemplary timing chart illustrating the change in the transactions generated by the LCD 130 and the CPU 120 when a timeout value for the LCD 130 is larger than that for the CPU 120. Referring to FIG. 2C, while the performance of the CPU 120 may be improved, the real-time operation of the LCD 130 may not be ensured due to a service time delay "delay2".

The semiconductor memory system 100 may improve the performance of both a first master group and a second master group by controlling a timeout value for each of the masters 120 through 150 that can be controlled as has been described with reference to FIGS. 2A through 2C.

Each of the masters 120 through 150 may be configured to generate a timeout index signal for setting a timeout value. For example, each of the devices of the first master group (e.g., masters 130 through 150) can generate a timeout index signal TI1, TI2, or TI3, respectively, based on the residual memory capacity of a data buffer (not shown) included within each of the first masters 130, 140, or 150. The timeout index signals may be derived from a predefined value stored in the memory controller 200. A timeout index signal TI0 for the second master group (e.g., master 120) may have a fixed value stored in advance in the memory controller 200.

In an exemplary embodiment, each of the masters 120 through 150 transmits each respective timeout index signal TI0, TI1, TI2, and TI3 to the memory controller 200 in the semiconductor memory device 160 through a route that is separate and independent from the data bus 110. In an exemplary embodiment, instead of using that separate route, each of the masters 120 through 150 transmit each respective timeout index signal TI0, TI1, and TI3 to the memory controller 200 in the semiconductor memory device 160 through the data bus 110.

FIG. 3 is a block diagram for explaining a method for detecting a residual capacity of the LCD 130 illustrated in FIG. 1 according to an exemplary embodiment of the present inventive concept. Referring to FIG. 3, the LCD 130 includes a register 131, a data buffer 132, a residual capacity detector 133, and a comparator 134.

The register 131 may store a threshold value THD of a residual capacity of the data buffer 132. The residual capacity of the data buffer 132 is the size of an unused portion of the data buffer 132. For example, this unused portion may be empty or include data that has been stored in the data buffer 132, but which has not yet been used for an operation of a master of the first master group (e.g., the LCD 130). The threshold value THD of the residual capacity of the data buffer 132 may be set to a percentage (e.g., 25%) of a total capacity of the data buffer 132. Alternately, the threshold value THD could specify a certain number of bits, bytes, units of bytes (e.g., 2 KB), etc.

The residual capacity detector 133 may detect the residual capacity of the data buffer 132 based on a position of a writing pointer of the data buffer 132 (hereinafter, referred to as a writing pointer position W_P) and/or a position of a reading pointer thereof (hereinafter, referred to as a reading pointer position R_P). For example, the residual capacity detector 133 may detect the residual capacity of the data buffer 132 based on a difference between the writing pointer position W_P and the reading pointer position R_P. The writing pointer position W_P and reading pointer position R_P may be received within signals received by the residual capacity detector 133 from the data buffer 132.

The comparator 134 may generate a timeout index signal (e.g., TI1), which varies with a result of comparing the residual capacity of the data buffer 132 and the threshold value THD.

Figure 4:
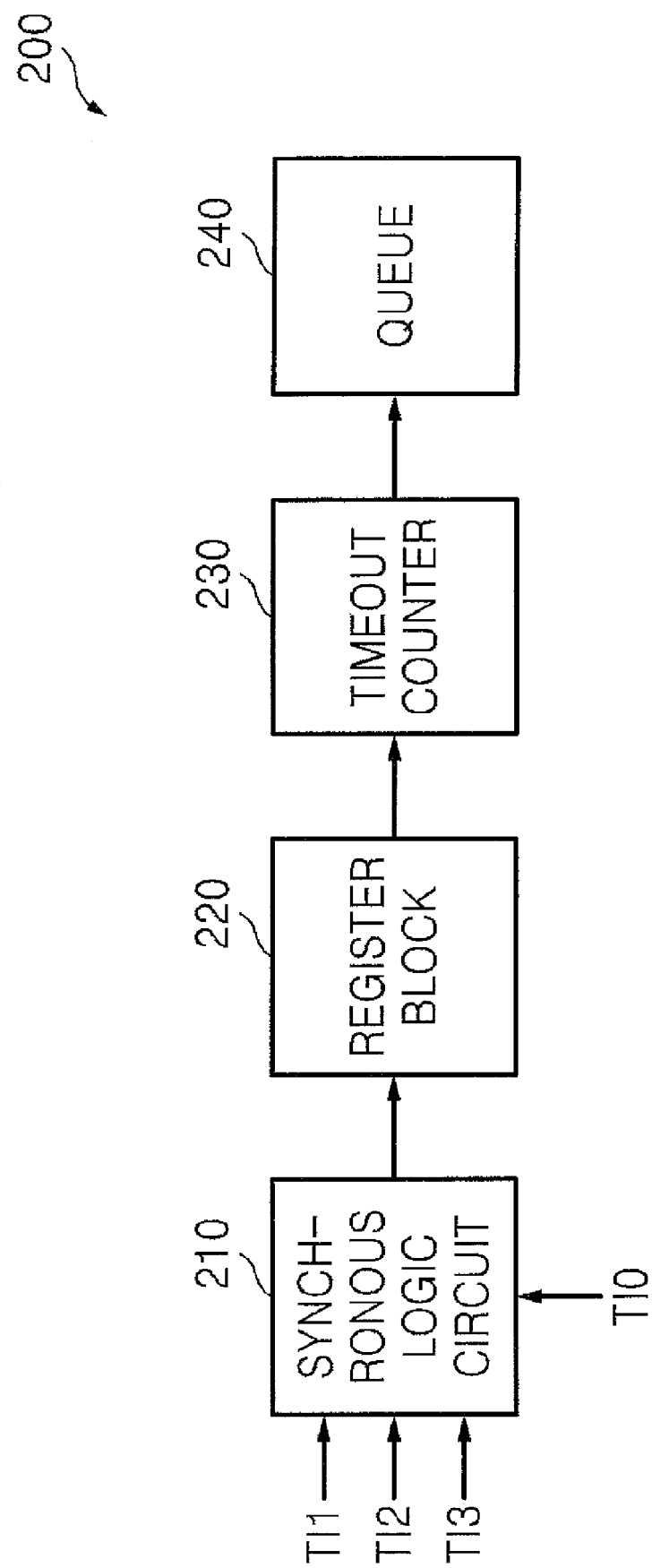
FIG. 4 is a block diagram of a memory controller illustrated in FIG. 1 according to an exemplary embodiment of the present inventive concept.

FIG. 4 is a block diagram of the memory controller 200 illustrated in FIG. 1 according to an exemplary embodiment of the present inventive concept. The memory controller 200 includes a synchronous logic circuit 210, a register block 220, a timeout counter 230, and the queue 240. The memory controller 200 may set a timeout value for each of the masters 120 through 150 in response to the timeout index signals TI0 through TI3 and change an execution order of commands based on a result of counting the timeout value for each master 120, 130, 140, or 150. The commands may be stored in the queue 240. The synchronous logic circuit 210 synchronizes an operating frequency of each of the masters 120 through 150 with a driving frequency of the semiconductor memory device 160. Accordingly, the semiconductor memory system 100 can efficiently operate on commands received from the masters 120 through 150 that have different operating frequencies.

Figure 5:
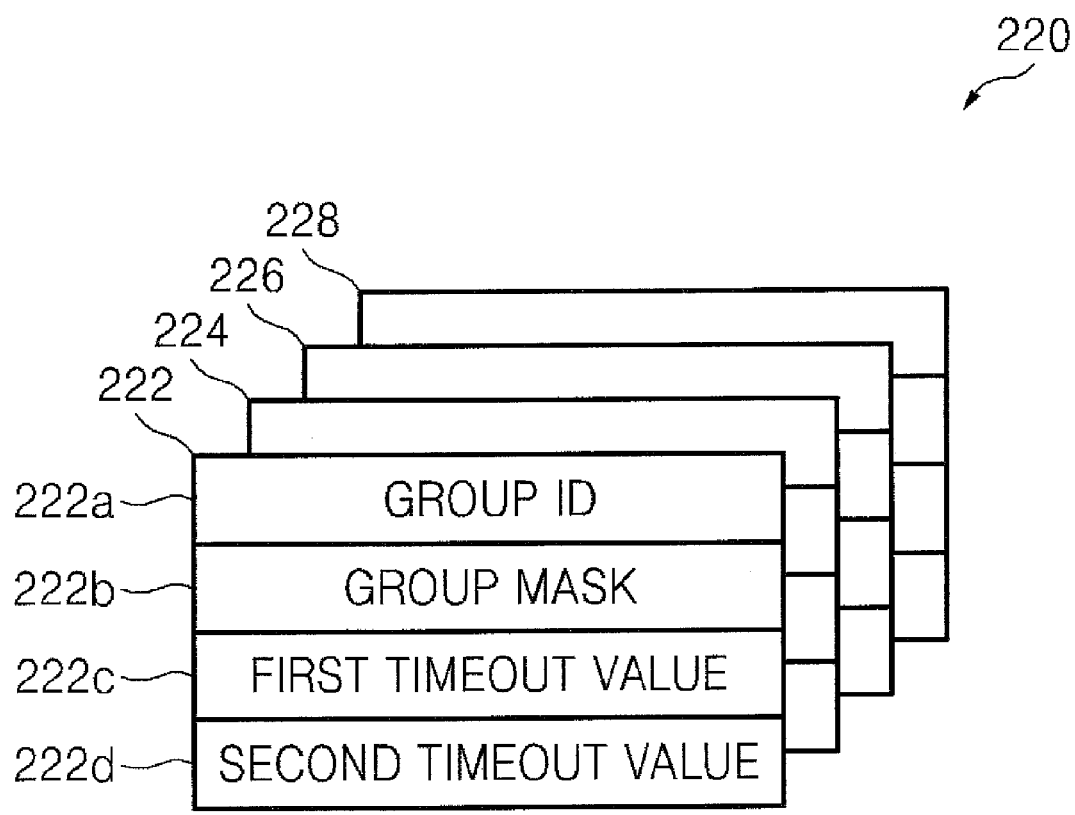
FIG. 5 is a conceptual diagram of a register block illustrated in FIG. 4 according to an exemplary embodiment of the present inventive concept.

The register block 220 sets a timeout value for each of the masters 120 through 150 in response to a timeout index signal output from the synchronous logic circuit 210. FIG. 5 is a conceptual diagram of the register block 220 illustrated in FIG. 4 according to an exemplary embodiment of present inventive concept. Referring to FIG. 5, the register block 220 includes registers 222, 224, 226, and 228 corresponding to the masters 120 through 150, respectively. While FIG. 5 shows only one register respectively corresponding to each of the four masters 120 through 150, the present inventive concept is not limited thereto. For example, one or more of the four masters 120 through 150 may be assigned multiple registers.

Referring to FIG. 5, each of the masters 120 through 150 may be identified by a group identification (ID) 222a indicating which master group each master belongs to and a group mask 222b identifying the particular master in the master group. For example, a first master in a first master group may be indicated by "0001", i.e., a combination of a group ID binary number "00" and a group mask binary number "01". A third master in a second master group may be indicated by "0111", i.e., a combination of a group ID binary number "01" and a group mask binary number "11".

Each of the registers 222, 224, 226, and 228 may store timeout values, i.e., a first timeout value 222c and a second timeout value 222d of a corresponding master. In FIG. 5, only two timeout values are stored in each of the registers 222, 224, 226, and 228, but the present inventive concept is not limited thereto. For example, one or more of the registers 222, 224, 226, and 228 may store a single or more than two timeout values.

In an exemplary embodiment of the inventive concept, a master of a first master group may have at least two different timeout values based on the residual capacity of a data buffer included therein, while a master of second master group may have only one fixed timeout value. Multiple timeout values for the first master group may be preset according to the structure of the semiconductor memory system 100 and updated when they vary with an operating environment.

In response to a timeout index signal, the register block 220 may select a master, for which a timeout value will be set, and selectively output one of the timeout values 222c or 222d. A master of the second master group may have a fixed timeout index signal and a fixed timeout value.

A procedure for setting a timeout value for each of the devices of the first master group (e.g., masters 130 through 150) will be described in detail with reference to FIGS. 3 through 5 below.

An example where a command generated by one master (e.g., 130) of the first master group (e.g., 130 through 150) is sent to the semiconductor memory device 160 is a read command will be described. Referring to FIG. 3, when the residual capacity of the data buffer 132 is larger than the threshold value THD thereof, a timeout value for the first master 130 is set to be larger than a timeout value for a second master. This means that since the size of data stored in the data buffer 132 provided for the operation of the first master 130 is large enough not to disturb the real-time operation of the first master 130 for a predetermined period of time, a command generated by the second master is executed prior to the read command generated by the first master 130. However, when the residual capacity of the data buffer 132 of the first master 130 is less than the threshold value THD thereof, the timeout value for the first master 130 is set to be less than the timeout value for the second master. This means that since the size of data stored in the data buffer 132 provided for the operation of the first master 130 is so small that the real-time operation of the first master 130 may be disturbed, the read command generated by the first master 130 is executed prior to the command generated by the second master to allow more data to be written to the data buffer 132 of the first master 130.

In an example where a command generated by one master (e.g., 130) of the first master group (e.g., 130 through 150) is sent to the semiconductor memory device 160 is a write command, when the residual capacity of the data buffer 132 is larger than the threshold value THD thereof, the timeout value for the first master 130 is set less than the timeout value for the second master. When the residual capacity of the data buffer 132 is less than the threshold value THD thereof, the timeout value for the first master 130 is set to be larger than the timeout value for the second master.

Table 1 shows examples of timeout values of the masters 120 through 150 in the semiconductor memory system 100 illustrated in FIG. 1.

TABLE 1

| Masters | First timeout values (cycles) | Second timeout values (cycles) |
|---|---|---|
| CPU | 10 | X |
| LCD | 2 | 50 |
| TV | 2 | 50 |
| Peripheral device | 5 | 256 |

Referring to Table 1, on the basis of an operating clock cycle of the memory controller 200, the timeout value of the CPU 120 is fixed to 10 cycles; the first and second timeout values of the LCD 130 and the TV 140 are set to 2 cycles and 50 cycles, respectively; and the first and second timeout values of the peripheral device 150 are set to 5 cycles and 256 cycles, respectively.

A procedure for setting the timeout value of the LCD 130, when a command generated by the LCD 130 and sent to the semiconductor memory device 160 is a read command, will be described in detail with reference to Table 1 and FIGS. 3 through 5 below. The timeout value of the CPU 120 is fixed to 10 cycles, while the timeout value of the LCD 130 is variable.

When the residual capacity of the data buffer 132 is larger than the threshold value THD thereof, the LCD 130 generates the timeout index signal TI1 at a logic "1". In response to the timeout index signal at the logic "1", the register block 220 generates the second timeout value, i.e., 50 cycles, which is larger than the timeout value, i.e., 10 cycles of the CPU 120. Accordingly, when the residual capacity of the data buffer 132 is large enough, a command generated by the CPU 120 is given priority over the read command generated by the LCD 130.

However, when the residual capacity of the data buffer 132 is less than the threshold value THD thereof, the LCD 130 generates the timeout index signal TI1 at a logic "0". In response to the timeout index signal at the logic "0", the register block 220 generates the first timeout value, i.e., 2 cycles, which is less than the timeout value, i.e., 10 cycles of the CPU 120. Accordingly, when the residual capacity of the data buffer 132 is not big enough, the read command generated by the LCD 130 is given priority over the command generated by the CPU 120.

The timeout counter 230 counts the timeout value of each of the masters 120 through 150 and outputs a count result to the queue 240. The queue 240 changes the execution order of commands based on the counting, thereby enabling the efficient operations of the masters 120 through 150.

FIG. 6 is a flowchart of a method of operating the semiconductor memory system 100 according to an exemplary embodiment of the present inventive concept. Referring to FIG. 1 and FIGS. 3 through 6, a first master (e.g., the LCD 130) detects a residual capacity of the data buffer 132 in operation S60. The first master compares the detected residual capacity of the data buffer 132 with the threshold value THD stored in the register 131 and generates a timeout index signal corresponding to the first master based on a result of the comparison in operation S61. The timeout index signal corresponding to the first master may vary with the comparison result.

The register block 220 of the memory controller 200 sets and outputs a timeout value of the first master based on the timeout index signal corresponding to the first device master in operation S62. The register block 220 outputs a fixed timeout value of a second master in response to a predetermined timeout index signal.

Subsequently, the timeout counter 230 counts the timeout value output from the register block 220 for each of the masters 120 through 150 and reports the completion of the counting for each of the masters 120 through 150 to the queue 240 in operation S63. For example, the timeout counter 230 may be set to the timeout value, and decrement itself periodically until reaching 0. The queue 240 changes the execution order of commands based on a count result received from the timeout counter 230 in operation S64. The semiconductor memory device 160 executes the commands in the changed execution order in operation S65.

FIG. 7 is a flowchart of operation S62 of setting the timeout value for the first master in the method illustrated in FIG. 6 according to an exemplary embodiment of the present inventive concept. Referring to FIG. 1 and FIGS. 3 through 7, the semiconductor memory system 100 determines whether a command generated by the first master and send to the semiconductor memory device 160 is a read command in operation S71. When the command of the first master is the read command, the semiconductor memory system 100 determines whether the residual capacity of the data buffer 132 is larger than the threshold value THD of the residual capacity of the data buffer 132 in operation S72.

When the residual capacity of the data buffer 132 is larger than the threshold value THD, the semiconductor memory system 100 sets the timeout value of the first master to be larger than the timeout value of the second master in operation S73. When the residual capacity of the data buffer 132 is not larger than the threshold value THD, the semiconductor memory system 100 sets the timeout value of the first master to be less than the timeout value of the second master in operation S74.

When the command of the first master sent to the semiconductor memory device 160 is not the read command (e.g., when the command is a write command), the semiconductor memory system 100 determines whether the residual capacity of the data buffer 132 is larger than the threshold value THD of the residual capacity of the data buffer 132 in operation S75. With respect to the write command, the semiconductor memory system 100 sets the timeout value of the first master to be less than the timeout value of the second master in operation S74 when the residual capacity of the data buffer 132 is larger than the threshold value THD and sets the timeout value of the first master to be larger than the timeout value of the second master in operation S73 when the residual capacity of the data buffer 132 is not larger than the threshold value THD.

The methods of the invention can also be embodied as computer readable codes on a computer readable recording medium. The computer readable medium or computer readable recording medium is any data storage device that can store data which can be thereafter read by a computer system. For example, the medium may include program storage devices such as a hard disk, magnetic floppy disk, RAM, ROM, CD ROM, etc., and be executable by any device or machine comprising suitable architecture, such as a general purpose digital computer having a processor, memory, and input/output interfaces.

As described above, according to at least one exemplary embodiment of the present inventive concept, timeout values of a plurality of masters connected to a semiconductor memory device are controlled in a semiconductor memory system so that the priority order of commands to be processed by the semiconductor memory system is dynamically determined. Accordingly, the overall performance of the semiconductor memory system can be improved.

While the present inventive concept has been particularly shown and described with reference to exemplary embodiments thereof, it will be understood by those of ordinary skill in the art that various changes in forms and details may be made therein without departing from the spirit and scope of the disclosure.

What is claimed is:

1. A method of controlling an order of executing commands of a plurality of master groups including a first master group and a second master group in a semiconductor system including a memory controller, comprising:
    generating a first timeout index signal, by a first master in the first master group, based on a result of comparing a residual memory capacity of a first data buffer in the first master with a first threshold value;
    generating a second timeout index signal, by a second master in the second master group, based on a result of comparing a residual memory capacity of a second data buffer in the second master with a second threshold value;
    selecting a first timeout value, by the memory controller, among a plurality of timeout values associated with the first master group in response to the first timeout index signal;
    selecting a second timeout value, by the memory controller, among a plurality of timeout values associated with the second master group in response to the second timeout index signal; and
    determining, by the memory controller, the order of executing the commands based on the selected timeout values including the first timeout value and the second timeout value.

2. The method of claim 1 further comprising counting, by the memory controller, the selected timeout values including the first timeout value and the second timeout value.

3. The method of claim 2, wherein the determining the order of executing the commands is based on a result of the counting the selected timeout values including the first timeout value and the second timeout value.

4. The method of claim 2, wherein the counting the selected timeout values includes incrementing or decrementing, by the memory controller, the selected timeout values until at least one of the selected timeout values reaches a predetermined value.

5. The method of claim 1, wherein the first master group includes masters in which real-time operation is important, and the second master group includes masters of which performances depend upon latency of a memory device.

6. The method of claim 5 further comprising storing the first threshold value of the residual memory capacity of the first data buffer into a first register of the first master, and storing the second threshold value of the residual memory capacity of the second data buffer into a second register of the second master.

7. The method of claim 1, wherein the selecting the first timeout value includes determining whether the command from the first master is a read command, and wherein the selecting the second timeout includes determining whether the command from the second master is the read command.

8. The method of claim 7, wherein the plurality of timeout values associated with the first master group include two different values so that the first timeout value can be one of those two different values, and the plurality of timeout values associated with the second master group include two different values so that the second timeout value can be one of those two different values.

9. The method of claim 8, wherein the two different values for the second timeout value are different from the two different values for the first timeout value.

10. The method of claim 9, wherein, in case the command from the first master is determined to be the read command, the first timeout value is set to be larger than the timeout value of the second master if the residual capacity of the first data buffer is larger than the first threshold value, and the first timeout value is set to be less than the timeout value of the second master if the residual capacity of the first data buffer is not larger than the first threshold value.

11. The method of claim 9, wherein, in case the command from the first master is not determined to be the read command, the first timeout value is set to be less than the timeout value of the second master if the residual capacity of the first data buffer is larger than the first threshold value, and the first timeout value is set to be larger than the timeout value of the second master if the residual capacity of the first data buffer is not larger than the first threshold value.

12. A method of controlling an order of executing commands of a plurality of master groups including a first master group and a second master group in a semiconductor system including a memory controller, comprising:
generating a first timeout index signal, by a first master in the first master group, based on a residual memory capacity of a first data buffer in the first master;
generating a second timeout index signal, by a second master in the second master group, based on a residual memory capacity of a second data buffer in the second master;
comparing the residual memory capacity of the first data buffer with a first threshold value of the residual memory capacity of the first data buffer;
comparing the residual memory capacity of the second data buffer with a second threshold value of the residual memory capacity of the second data buffer;
if the residual memory capacity of the first data buffer in the first master is larger than the first threshold value of the residual memory capacity of the first data buffer, selecting, among a first timeout value and a second timeout value, by the memory controller, the second timeout value for the first master in response to the first timeout index signal, the second timeout value being larger than the first timeout value, and if the residual memory capacity of the first data buffer in the first master is less than the first threshold value of the residual memory capacity of the first data buffer, selecting the first timeout value for the first master in response to the first timeout index signal;
if the residual memory capacity of the second data buffer in the second master is larger than the second threshold value of the residual memory capacity of the second data buffer, selecting, among a third timeout value and a fourth timeout value, by the memory controller, the fourth timeout value for the second master, in response to the second timeout index signal, the fourth timeout value being larger than the third timeout value, and if the residual memory capacity of the second data buffer in the second master is less than the second threshold value of the residual memory capacity of the second data buffer, selecting the third timeout value for the second master in response to the second timeout index signal; and
determining, by the memory controller, the order of executing the commands based on the selected timeout value for the first master and the selected timeout value for the second master.

13. A method of controlling an order of executing commands of a plurality of master groups including a first master group and a second master group in a semiconductor system including a memory controller, comprising:
generating a first timeout index signal, by a first master in the first master group, based on a result of comparing a residual memory capacity of a first data buffer in the first master with a first threshold value;
generating a second timeout index signal, by a second master in the second master group, based on a result of comparing a residual memory capacity of a second data buffer in the second master with a second threshold value;
selecting a first timeout value, by the memory controller, among a plurality of timeout values associated with the first master group in response to the first timeout index signal;
selecting a second timeout value, by the memory controller, among a plurality of timeout values associated with the second master group in response to the second timeout index signal;
incrementing or decrementing, by the memory controller, the selected timeout values together until one of the selected timeout values reaches a predetermined value;
giving a priority to a first command from the first master if the first timeout value reaches the predetermined value before the second timeout value reaches the predetermined value, or giving a priority to a second command from the second master if the second timeout value reaches the predetermined value before the first timeout value reaches the predetermined value; and
determining, by the memory controller, the order of executing the commands based on a result of the giving the priority.

14. A method of controlling an order of executing commands of a plurality of masters including a first master and a second master in a semiconductor system including a memory controller, comprising:

generating a first timeout index signal, by the first master, based on a result of comparing a residual memory capacity of a first data buffer in the first master with a first threshold value;

generating a predetermined second timeout index signal, by the second master;

among a first timeout value and a second timeout value associated with the first master, the second timeout value being larger than the first timeout value, selecting one of the first timeout value and the second timeout value for the first master, by the memory controller, in response to the first timeout index signal;

generating a predetermined second timeout value for the second master, by the memory controller, in response to the second timeout index signal, the predetermined second timeout value being larger than the first timeout value and being less than the second timeout value; and determining, by the memory controller, the order of executing the commands based on the selected timeout value and the generated predetermined second timeout value.

15. The method of claim 14, wherein, in case the command from the first master is determined to be a read command, the second timeout value is selected for the first master if the residual capacity of the first data buffer is larger than the first threshold value of the residual memory capacity of the first data buffer, and the first timeout value is selected if the residual capacity of the first data buffer is not larger than the first threshold value.

16. A method of controlling an order of executing commands of a plurality of masters including a first master and a second master in a semiconductor system including a memory controller, comprising:

generating a first timeout index signal, by the first master, based on a result of comparing a residual memory capacity of a first data buffer in the first master with a first threshold value;

transmitting the first timeout index signal from the first master to the memory controller either via a data bus or via a first route between the first master and the memory controller, the first route being separate and independent of the data bus;

generating a second timeout index signal, by the second master, based on a result of comparing a residual memory capacity of a second data buffer in the second master with a second threshold value;

transmitting the second timeout index signal from the second master to the memory controller either via the data bus or via a second route between the second master and the memory controller, the second route being separate and independent of the data bus; and determining the order of executing the commands based on timeout index signals including the first and the second timeout index signals.

17. The method of claim 16 further comprising transmitting the first timeout index signal from the first master to the memory controller via the data bus, and transmitting the second timeout index signal from the second master to the memory controller via the data bus.

18. The method of claim 16 further comprising transmitting the first timeout index signal from the first master to the memory controller via the first route, and transmitting the second timeout index signal from the second master to the memory controller via the second route.

19. A memory controller for controlling an order of executing commands of a plurality of master groups, each of the plurality of master group including at least one master, comprising:

a register block configured to select a timeout value for each master among a plurality of timeout values associated with that master in response to a timeout index signal from that master based on a result of comparing a residual memory capacity of a data buffer in that master with a threshold value;

a queue configured to determine the order of executing the commands based on the selected timeout values;

a timeout counter configured to count the selected timeout values together and output a result to the queue; and a synchronous logic circuit configured to synchronize an operating frequency of each master with a driving frequency of a semiconductor memory device, wherein the register block includes a plurality of registers that contain a group identification indicating which master group a particular master belongs to, a group mask identifying the particular master in the master group, and at least one timeout value of the particular master.

20. The memory controller of claim 19, wherein each of the plurality of registers corresponds to one and only one of the masters.

21. The memory controller of claim 19, wherein at least one master among the masters is assigned to more than one registers.

22. The memory controller of claim 19, wherein at least one register among the plurality of registers corresponds to more than one masters among the masters.

23. A semiconductor system comprising:

a plurality of master groups including a first master group and a second master group, the first master group including a first master, the second master group including a second master;

a memory controller;

a data bus connecting the memory controller and the first master and connecting the memory controller and the second master;

a first channel connecting the first master and the memory controller, the first channel being separate and independent of the data bus; and a second channel connecting the second master and the memory controller, the second channel being separate and independent of the data bus, wherein the first master is configured to generate a first timeout index signal based on a result of comparing a residual memory capacity of a first data buffer in the first master with a first threshold value and transmit the first timeout index signal either via the data bus or via the first channel, the second master is configured to generate a second timeout index signal based on a result of comparing a residual memory capacity of a second data buffer in the second master with a second threshold value and transmit the second timeout index signal either via the data bus or via the second channel, and the memory controller is configured to set at least one timeout value for the first master group among a plurality of timeout values associated with the first master group in response to the first timeout index signal, set at least one timeout value for the second master group among a plurality of timeout values associated with the second master group in response to the second timeout index signal, and determine an order of executing commands based on the timeout values.

24. The semiconductor system of claim 23, wherein the first master group includes masters in which real-time operation is important, and the second master group includes masters of which performances depend upon latency of a memory device.

25. The semiconductor system of claim 24, wherein the first master group includes a liquid crystal display, a television and a peripheral device, and the second master group includes a central processing unit and a multi-format codec sub-system.

26. The semiconductor system of claim 23, wherein the first master further includes a first register for storing the first threshold value of the residual memory capacity of the first data buffer, a first residual capacity detector being configured to detect the residual memory capacity of the first data buffer, and a first comparator being configured to compare the residual memory capacity of the first data buffer with the first threshold value and generate the first timeout index signal.

27. The semiconductor system of claim 26, wherein the first timeout index signal varies with a result of the comparing the residual memory capacity of the first data buffer with the first threshold value.

28. The semiconductor system of claim 23, wherein the at least one timeout value for the second master group is a predetermined value stored in the memory controller.

29. A method of controlling an order of executing commands of a plurality of masters including a first master and a second master in a semiconductor system including a memory controller, comprising:
    generating a first timeout index signal, by the first master, based on a result of comparing a residual memory capacity of a first data buffer in the first master with a first threshold value;
    generating a second timeout index signal, by the second master, based on a result of comparing a residual memory capacity of a second data buffer in the second master with a second threshold value;
    selecting one timeout value for the first master, by the memory controller, in response to the first timeout index signal;
    selecting one timeout value for the second master, by the memory controller, in response to the second timeout index signal; and
    determining, by the memory controller, the order of executing the commands based on the selected timeout values.

30. A method of controlling an order of executing commands of a plurality of masters including a first master and a second master in a semiconductor system including a memory controller, comprising:
    generating a first timeout index signal, by the first master, based on a result of comparing a residual memory capacity of a first data buffer in the first master with a first threshold value;
    generating a predetermined second timeout index signal, by the second master;
    among a first timeout value and a second timeout value associated with the first master, the second timeout value being larger than the first timeout value, selecting one of the first timeout value and the second timeout value for the first master, by the memory controller, in response to the first timeout index signal;
    among a third timeout value and a fourth timeout value associated with the second master, the fourth timeout value being larger than the third timeout value, selecting one of the third timeout value and the fourth timeout value for the second master, by the memory controller, in response to the second timeout index signal; and
    determining, by the memory controller, the order of executing the commands based on the selected timeout values.

31. The method of claim 30, wherein,
    if a residual memory capacity of the first data buffer in the first master is larger than the first threshold value of the residual memory capacity of the first data buffer, the first master generates the first timeout index signal with a logic "1," and if the residual memory capacity of the first data buffer in the first master is less than the first threshold value of the residual memory capacity of the first data buffer, the first master generates the first timeout index signal with a logic "0", and
    if a residual memory capacity of the second data buffer in the second master is larger than a second threshold value of the residual memory capacity of the second data buffer, the second master generates the second timeout index signal with the logic "1," and if the residual memory capacity of the second data buffer in the second master is less than the second threshold value of the residual memory capacity of the second data buffer, the second master generates the second timeout index signal at the logic "0".

32. The method of claim 31, wherein
    if the first timeout index signal is generated with the logic "1", the second timeout value is selected for the first master in response to the first timeout index signal, and if the first timeout index signal is generated with the logic "0", the first timeout value is selected for the first master in response to the first timeout index signal, and
    if the second timeout index signal is generated with the logic "1", the fourth timeout value is selected for the second master in response to the second timeout index signal, and if the second timeout index signal is generated with the logic "0", the third timeout value is selected for the second master in response to the second timeout index signal.

33. The semiconductor system of claim 24, wherein the first master is configured to generate transactions at predetermined intervals based on a clock of an image signal and the second master is configured to irregularly generate transactions according to an operation state.

34. The semiconductor system of claim 26, wherein the first data buffer is configured to output a position of a write pointer and a position of a read pointer to the first residual capacity detector, and the first residual capacity detector is configured to detect the residual memory capacity based on a difference between the position of the write pointer and the position of the read pointer.

35. The semiconductor system of claim 26, wherein the first threshold value is a predefined percentage of a size of the first data buffer.

* * * * *